Figure 1:
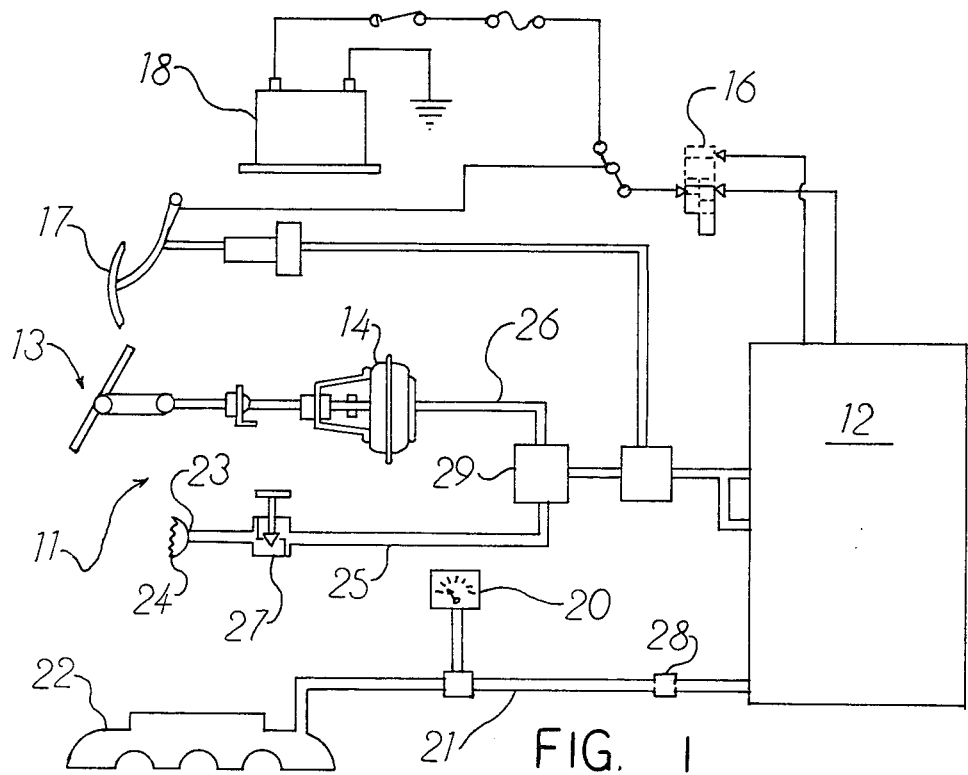

United States Patent [19]
Haugeberg

[11] 4,363,373
[45] Dec. 14, 1982

[54] VACUUM CONTROL APPARATUS

[76] Inventor: Ronald H. Haugeberg, River Rd., Glendive, Mont. 59330

[21] Appl. No.: 185,227

[22] Filed: Sep. 8, 1980

[51] Int. Cl.³ .................................................. B60K 31/00
[52] U.S. Cl. ........................................ 180/175; 123/360
[58] Field of Search .................... 180/170, 175, 178; 123/360, 389

[56] References Cited
U.S. PATENT DOCUMENTS

| | | | |
|---|---|---|---|
| 3,068,849 | 12/1962 | Thorner | 180/175 X |
| 3,322,227 | 5/1967 | Thorner | 180/175 |
| 3,489,239 | 1/1970 | Thorner | 180/175 X |
| 4,098,368 | 7/1978 | Riddel | 180/175 |
| 4,217,969 | 8/1980 | Riddel | 180/175 |

Primary Examiner—Joseph F. Peters, Jr.
Assistant Examiner—Michael Mar
Attorney, Agent, or Firm—Arthur L. Urban

[57] ABSTRACT

Vacuum control apparatus for a vehicle having a speed control unit including a first vacuum line from the engine of the vehicle to the control unit and a second vacuum line from the control unit to a throttle servo of the engine, the vacuum control apparatus including vacuum measuring mechanism associated with the first vacuum line from the vehicle engine to the speed control unit, a supply of air to the second vacuum line from the speed control unit to the throttle servo, mechanism for selectively metering air into the second vacuum line, whereby sufficient air can be metered into the second vacuum line when the vacuum created by the engine decreases to prevent the speed control unit from opening the throttle excessively.

3 Claims, 2 Drawing Figures

VACUUM CONTROL APPARATUS

This invention relates to a novel vacuum control apparatus and more particularly relates to a new apparatus for controlling the vacuum of vehicle speed control units.

The speed of vehicles ordinarily is determined by the rate at which fuel and combustion air are fed to the engine. If more fuel is fed to the engine, the engine will generate more power and drive the vehicle faster. Ordinarily, the rate at which the fuel is fed to the engine is controlled by a throttle. The throttle generally is a foot operated pedal which is biased in an idle position. To feed the fuel to the engine more rapidly, the throttle is depressed with a foot. When it is desired to reduce the speed of a vehicle, the foot pressure on the throttle pedal is decreased allowing the pedal to be lifted by the pressure of a spring.

A constant speed is extremely difficult to maintain during long trips. Slight changes in foot pressure applied to the throttle pedal may be required. Also, the driver's leg may become tired from maintaining his foot in contact with the throttle for many hours at a time. As the driver's leg becomes more tired, maintaining a uniform speed becomes still more difficult. These problems are more significant when a driver is traveling through mountainous country where it is necessary to make substantial changes in the amount of fuel fed to the engine in order to maintain a relatively constant speed on upgrades and downgrades.

In recent years, the use of speed control units on vehicles has become very popular. These units rely on vacuum from the engine to change the position of the throttle and thereby control the speed of the engine. A speed selector/sensing unit controls the amount of vacuum applied to the throttle and thus controls the degree to which the throttle is opened.

Such speed control units utilize a speed sensing element and suitable circuitry to open a metering valve in the vacuum line from the engine to a servo connected to the throttle of the engine. The driver sets the unit for automatic operation when he reaches the desired speed, and the unit maintains the same speed thereafter without the necessity for the driver to maintain foot pressure on the throttle pedal.

One of the problems with such speed control units is encountered in hilly or mountainous country. The unit usually can prevent the speed of the vehicle from becoming excessive on slight downgrades without the assistance of the driver. However, on upgrades, the unit may open the throttle an excessive amount in an attempt to maintain the speed set into the unit. Opening the throttle too much can cause the load on the engine to become excessive. This can cause excessive wear on the moving parts of the engine and premature failure. Also, opening the throttle too much wastes fuel and lowers the fuel efficiency of the engine. This results in higher than necessary fuel bills and also unnecessary engine repair bills.

With the recent large increases in the cost of operating a vehicle, many owners are trying to reduce or at least minimize increases in their car expenses. One major expense is fuel cost. Car owners are attempting to economize by buying cars with higher fuel efficiency. The fuel efficiency of a vehicle not only depends upon the engine itself but also depends upon the manner in which the vehicle is operated. If a vehicle is to be operated fuel efficiently, the driver must carefully control the vehicle.

Another factor influencing fuel economy is the accessories present on the vehicle. For example, automatic transmissions, power steering, power brakes, air conditioning and the like have an adverse effect on fuel economy. Attempts have been made to design automobile components so they will be more fuel efficient. One car manufacturer is now offering an automatic transmission that includes an overdrive gear.

Speed controls theoretically should save fuel since they maintain the vehicle at a uniform speed. However, in use speed control units offered to date actually may reduce the fuel efficiency of vehicles, particularly those in hilly or mountainous areas.

The present invention provides a novel vacuum control apparatus which increases the fuel efficiency of vehicles equipped with speed control units. The vacuum control apparatus of the invention controls the operation of an engine so that it does not operate inefficiently. This control of the engine is achieved automatically when the apparatus of the invention is placed in operation.

The vacuum control apparatus of the invention can be used easily by most drivers after only a minimum of instruction. The apparatus can be adjusted to provide different operating conditions for a given speed as the driver desires.

The vacuum control apparatus of the present invention is simple in design and relatively inexpensive to manufacture. The apparatus can be fabricated from commercially available materials and components using conventional manufacturing techniques.

Figure 2:
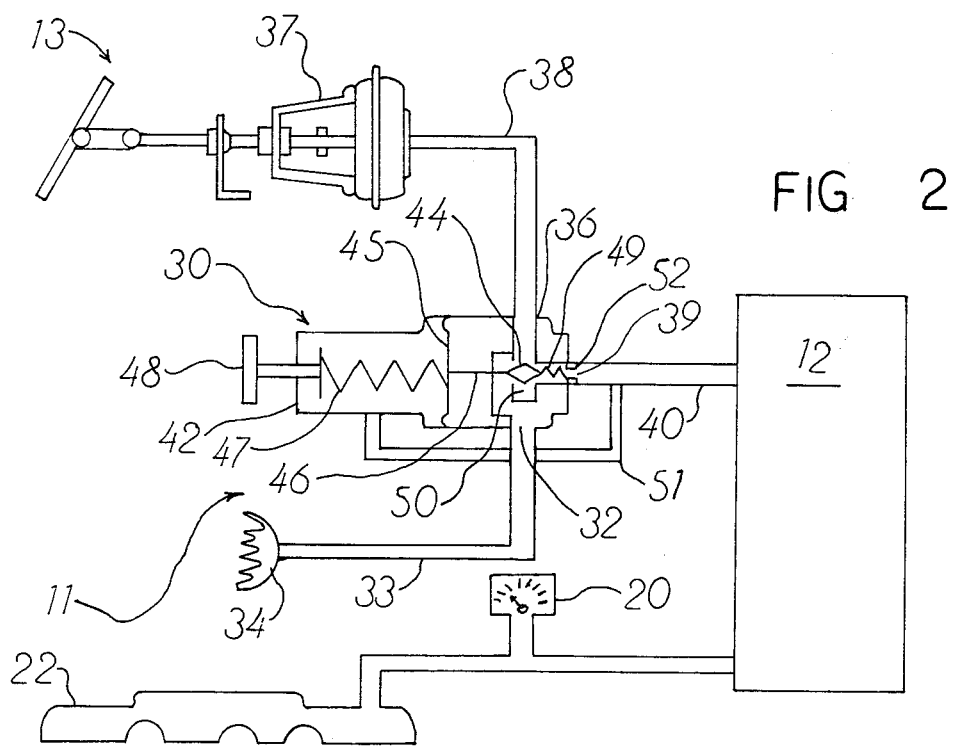

Other benefits and advantages of the novel vacuum control apparatus of the present invention will be apparent from the following description and the accompanying drawings in which:

FIG. 1 is a schematic illustration of one form of the vacuum control apparatus of the invention in use with a speed control regulator of a vehicle engine; and FIG. 2 is an enlarged fragmentary schematic illustration of another form of the vacuum control apparatus of the invention.

As shown in FIG. 1, vacuum control apparatus 11 of the present invention is used in combination with a speed control regulator unit 12. The apparatus 11 and the regulator 12 are included in a vehicle control system including a throttle linkage 13 with a servo 14.

Regulator 12 is energized by an engagement switch 16 which may be located at the end of a turn signal lever (not shown). The regulator 12 may be disengaged by switch 16 or by stepping on brake pedal 17. The switch 16 and pedal 17 are energized by a battery 18 or an alternator (not shown).

The vacuum control apparatus 11 of the invention includes vacuum measuring means shown as a vacuum gauge 20 which is located in a first vacuum line 21 from the vehicle engine 22 to regulator 12. A supply of air through inlet 23 with a filter 24 passes through line 25 to a second vacuum line 26 from speed regulator 12 to servo 14.

The vacuum control apparatus 11 also includes means for metering air from inlet 23 into the second vacuum line 26. This metering means includes a needle valve 27 located in line 25. Advantageously, flow restricting means 28 is disposed in the first vacuum line 21.

FIG. 2 illustrates another form of the vacuum control apparatus of the invention. As shown, valve means 30 is disposed in vacuum line 26 in place of tee fitting 29 shown in FIG. 1. Valve 30 operates automatically and advantageously is a diaphragm actuated valve as shown. Valve 30 has one inlet opening 32 connected to an air line 33 with a filter inlet 34. A second valve opening 36 is connected to throttle servo 37 through a vacuum line 38. The outlet 39 of valve 30 is connected to regulator 12 through a vacuum line 40.

Valve 30 includes a housing 42 in which is disposed a diaphragm 45. A valving element 44 which is disposed within a chamber 50 in housing 42 is connected to a diaphragm 45 through a rod 46. Biasing means shown as spring 47 extends from the opposite side of the diaphragm 45 into contact with an adjusting knob 48. Valve 30 also includes a second biasing means shown as spring 49 which extends between housing 42 and the end of valving element 44 remote from the diaphragm 45.

Chamber 50 of valve 30 communicates with valve opening 32 connected to air line 33. Similarly, chamber 50 communicates with valve opening 36 connected to vacuum line 38 and throttle servo 37. Chamber 50 further communicates with outlet 39 which is joined to regulator 12 through vacuum line 40. A sensing line 51 connects vacuum line 40 with the portion of housing 42 including spring 47. Line 51 enables vacuum to act on diaphragm 45 opposing spring 47.

In the operation of the system illustrated in FIG. 1, the driver of a vehicle sets the desired speed in the conventional manner, for example, by depressing engagement switch 16 that is located at the end of a turn signal lever (not shown). Next, needle valve 27 is opened until the vacuum supplied to throttle servo 14 is reduced to a point where the throttle begins to close and the vacuum level of the engine increases to a desired level as indicated on vacuum gauge 20.

If the vehicle thereafter encounters a significant upgrade and there is an increase in the load on the engine, a decrease in the vacuum level of the engine will occur. This decrease in the vacuum level of the engine will result in less vacuum being applied to the throttle servo 14. With less vacuum being applied to the throttle servo 14, the throttle 13 will close causing the speed of the vehicle to decrease preventing overloading of the engine.

This closing of the throttle as the vacuum level of the engine decreases completely changes the normal engine operation which would take place with speed control regulator 12 when not combined with the vacuum control apparatus 11 of the present invention. With the speed control regulator 12 alone, a decrease in the speed of the vehicle causes more vacuum on the servo opening the throttle and may produce excessive load on the engine with a resultant sacrifice of the engine and fuel efficiency.

When the vehicle reaches the top of an upgrade and is travelling on a level section of the roadway, the load on the engine will decrease with a corresponding increase in the vacuum level of the engine. The increase in vacuum level will increase the vacuum applied to the throttle servo 14, causing it to open the throttle enabling the vehicle to accelerate to the maximum pre-set speed. Since the load on the engine is not excessive, this increase in speed can be accomplished with the engine operating efficiently.

The vacuum control apparatus shown in FIG. 2 functions in a similar manner to the apparatus shown in FIG. 1 but operates automatically without requiring the setting of a needle valve 27. Valve 30 alternately varies the amount of vacuum or air applied to the throttle servo 37. If the vacuum level of the engine drops with an increasing engine load when a vehicle encounters a significant upgrade, spring 47 overcomes the resistance of diaphragm 45 and spring 49 to move valving element 44 to the right allowing air from air line 33 to enter chamber 50 while at the same time reducing the vacuum applied to throttle servo 37. This decrease in the vacuum applied to throttle servo 37 causes the throttle to close and thereby avoids any further increase in the load on the engine.

Upon reaching a level section of the roadway, the load on the engine decreases and the vacuum level thereof increases. The resistance of diaphragm 45 together with the pressure of spring 49 overcomes the resistance of spring 47 moving valving element 44 to the left. This movement of valving element 44 reduces the air moving into chamber 50 and increases the vacuum applied to throttle servo 37 to open the throttle and increase the speed of the vehicle to that previously set on the regulator 12.

The use of three-way switching valve 30 in place of needle valve 27 and flow restricting means 28 provides more precise maintenance of the vacuum applied to the throttle servo since the three-way switching valve is very responsive to changes in the vacuum level of the engine. The vacuum level set point is selected by the driver by turning adjusting knob 48 to change the effective length of spring 47 and thus the pressure applied thereby on diaphragm 45. The sensitivity of the system is set by turning support 52 to change the effective length of spring 49 and thus the pressure applied thereby on valving element 44.

The above description and the accompanying drawings show that the present invention provides a novel apparatus for use in combination with a vehicle speed control regulator. The apparatus of the invention controls the vacuum applied to the throttle servo enabling the engine to be run more efficiently. More efficient operation of the vehicle engine provides improved fuel economy and longer engine life.

The vacuum control apparatus of the invention prevents overloading of an engine such as may occur when a vehicle is travelling up a grade. The load on the engine is automatically controlled upon placing the apparatus into operation. The vacuum control apparatus of the invention can be used by most drivers after only a minimum of instruction. The apparatus enables a driver to operate a vehicle engine efficiently under different conditions easily.

The vacuum control apparatus of the present invention is simple in design and relatively inexpensive to manufacture. The apparatus can be fabricated from commercially available materials and components using industry accepted techniques.

It will be apparent that various modifications can be made in the particular forms of the vacuum control apparatus described in detail above and shown in the drawings within the scope of the invention. For example, the size, configuration and arrangement of components can be changed to meet specific requirements. Furthermore, the types of valves employed can be different provided the functioning and operation of the apparatus and the speed control regulator are not deleteriously affected. Therefore, the scope of the invention is to be limited only by the following claims.

What is claimed is:

1. Control apparatus for a vehicle having a speed control unit, said speed control unit being responsive to the vacuum created by the engine of said vehicle and including a first vacuum line from the engine of said vehicle to said speed control unit and a second vacuum line from said speed control unit to a throttle servo of said engine; said control apparatus including vacuum measuring gauge means disposed in said first vacuum line from said vehicle engine to said speed control unit, flow restricting means disposed in said first vacuum line, an air supply line including a filter providing a supply of air at atmospheric pressure to said second vacuum line from said speed control unit to said throttle servo, adjustable valve means disposed in said air supply line for selectively metering said air into said second vacuum line; whereby said valve means is adjustable by the vehicle operator in relation to the engine vacuum as displayed on said vacuum measuring gauge so that a selected flow of air can be metered into said second vacuum line when the vehicle speed drops sufficiently to decrease the vacuum created by said engine and thereby prevent said speed control unit from opening said throttle excessively while enabling the operator to selectively control the operation of the engine.

2. Control apparatus according to claim 1 wherein said adjustable valve means includes an adjustable diaphragm actuated switching valve automatically coordinating the vacuum in said second vacuum line and the flow of said air therethrough.

3. Vacuum control apparatus according to claim 1 wherein said adjustable valve means includes a needle valve.

* * * * *